No. 708,165. Patented Sept. 2, 1902.
G. N. PIFER.
PHOTOGRAPHIC PLATE.
(Application filed Oct. 25, 1901.)
(No Model.)
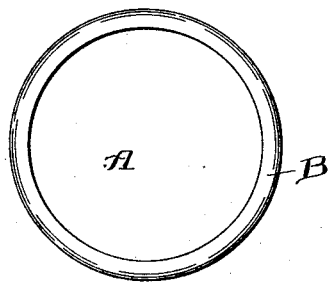
Fig. I.
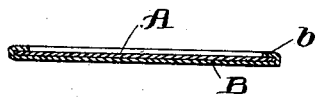
Fig. II.
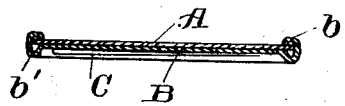
Fig. IV.
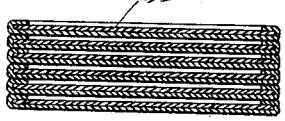
Fig. III.
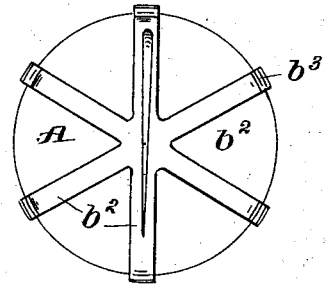
Fig. V.
WITNESSES:
F. Griswold
N. E. Merkel
INVENTOR.
G. N. Pifer
BY J. D. Fay ATTORNEY.
THE NORRIS PETERS CO., PHOTO-LITHO., WASHINGTON, D. C.

UNITED STATES PATENT OFFICE.

GEORGE N. PIFER, OF CLEVELAND, OHIO, ASSIGNOR TO THE AMERICAN AUTOMATIC PHOTOGRAPH COMPANY, OF CLEVELAND, OHIO, A CORPORATION OF OHIO.

PHOTOGRAPHIC PLATE.

SPECIFICATION forming part of Letters Patent No. 708,165, dated September 2, 1902.

Application filed October 25, 1901. Serial No. 79,995. (No model.)

*To all whom it may concern:*

Be it known that I, GEORGE N. PIFER, a citizen of the United States, and a resident of Cleveland, county of Cuyahoga, and State of Ohio, have invented a new and useful Improvement in Photographic Plates, of which the following is a specification, the principle of the invention being herein explained and the best mode in which I have contemplated applying that principle, so as to distinguish it from other inventions.

My invention consists of a photographic plate sensitized so as to produce upon exposure in a camera a positive picture, said plate being provided with a mount, whereby it is especially adapted for use in apparatus for the automatic production of photographic pictures, said mount insuring safety of the plate while it is being transported or when it is stored with others in the plate-reservoir of the apparatus and also facilitating the feeding of the plate from said reservoir and the subsequent handling of the plate by the mechanism, whereby it is exposed, developed, fixed, and delivered. The mount also constitutes a permanent frame for the finished picture.

In the accompanying drawings, Figure 1 represents a view of the sensitized face of a photographic plate constructed in accordance with my invention. Fig. 2 is a transverse section of said plate. Fig. 3 is a sectional view illustrating a number of such plates piled one above another. Fig. 4 is a sectional view of a special form of my improved photographic plate, and Fig. 5 is a rear view of a modified form of the same.

The sensitized plates heretofore used in apparatus intended for the automatic production of photographic pictures have been similar to ordinary ferrotype-plates—that is to say, they have been plates of thin sheet metal provided on one surface with a sensitive film designed to produce a positive picture when exposed in a photographic camera, and there are many objections to such plates as ordinarily used. In the first place, the piling of the plates one above another in the plate-reservoir of the apparatus frequently causes injury to the sensitive films by reason of the contact of the film of each plate with the plate above it, and in damp weather the softening of the films causes the same to adhere to the superimposed plate, so as to practically destroy the film and prevent delivery of the plates one at a time as required in the operation of the apparatus. Moreover, the films under certain atmospheric conditions have a tendency to peel off of the metal plates to which they have been applied, and the plates are so thin and light that the delivery of the same successively from the reservoir and their subsequent handling by the mechanism whereby they are subjected to the successive operations of exposure, development, and fixing is not as certain or effective as desired, and the pictures when delivered from the machine are in an incomplete state and must be provided with a frame or mounted before they are ready for delivery.

In carrying out my invention with the view of overcoming the objections above noted I provide the sensitized plate A with a mount consisting of a backing-plate B, of sheet metal or other available material, said plate B having its edge inturned and overlapping the edge of the sensitized plate A, so as to form an edge flange or rim $b$, surrounding the latter and projecting above the sensitized face of the same, as shown in Fig. 2. The sensitized plate thus mounted and provided with a flanged rim is strong and rigid, so that it can without risk of injury be subjected to the various operations necessary in producing the picture, its increased weight rendering more certain than usual those operations which are dependent upon gravity and its strength and rigidity permitting the use of correspondingly strong and positively-acting mechanism for conveying it from place to place in the apparatus where such conveyance is not dependent upon gravity. The projecting edge rim also protects the sensitized face of the plate from contact with and injury by a superposed plate when the plates are stacked or piled in the plate-reservoir of the apparatus, as in Fig. 2, and the bulk and rigidity of the mounted plate simplify and render more certain than usual the action of the mechanism whereby the plates are discharged in succession from the reservoir. Moreover, the picture when finally delivered from the apparatus is completely finished and mounted. Hence the apparatus can be entirely automatic in its action, as it does not need the services of an attendant to finish and prepare for delivery the photographic picture produced by said apparatus.

In some cases I provide the plate B with a pin, such as shown at C in Fig. 4, whereby it may be attached to a coat or other garment, and in this case I form a projecting edge rim or flange $b'$ at the rear as well as in front of the plate, so as to protect the sensitized face of the under plate from injury by contact with said pin.

While I prefer in all cases to use a continuous backing-plate B with continuous rim or flange $b$, as shown in Fig. 2, I may in some cases use in place of said continuous backing-plate an open frame or spider, such as shown at $b^2$ in Fig. 5, the arms of this spider overlapping the face of the sensitized plate A and having rearwardly-projecting ribs or flanges $b^3$ of the same character and for the same purpose as the rear flange $b'$. (Shown in Fig. 4.)

I am aware that photographic sensitive films have been provided with borders or rims as a substitute for the paper or glass backings upon which such films are usually mounted and also that photographic films have for the purpose of convenience in handling them in the process of developing and fixing been confined to metallic trays by means of a removable front frame of wire or equivalent material; but my sensitive plate is distinct from these prior devices, first, in that it is adapted when exposed in the camera to produce a positive picture, and, secondly, in that the mounting is a permanent part of it, which constitutes a frame for the finished picture and renders the unitary structure strong and rigid, so that it is capable of being handled without injury.

Having thus described my invention, I claim and desire to secure by Letters Patent—

1. A photographic sensitive plate having a mount permanently confined thereto and flanged so as to overlap the edge of the plate both in front and rear, substantially as specified.

2. A photographic sensitive plate having a mount consisting of a backing-plate with edge flange lapped around the edge of the sensitive plate and permanently confined thereto, substantially as specified.

3. A photographic sensitive plate having a mount permanently secured thereto and forming at the edge of the plate flanges projecting both forwardly and rearwardly therefrom, substantially as specified.

4. A photographic sensitive plate having a mount permanently secured thereto and forming flanges projecting beyond the plate both in front and rear and an attaching device secured to said mount and projecting therefrom to a less extent than the rear flange, substantially as specified.

5. A photographic sensitive plate having a mount permanently secured thereto and consisting of a sunken back plate with edge flange overlapping the edge of the sensitive plate, and an attaching device secured to said back plate and contained within the sunken portion of the same, substantially as specified.

Signed by me this 22d day of October, 1901.

GEORGE N. PIFER.

Attest:
A. E. MERKEL,
D. T. DAVIES.